(No Model.) 3 Sheets—Sheet 2.

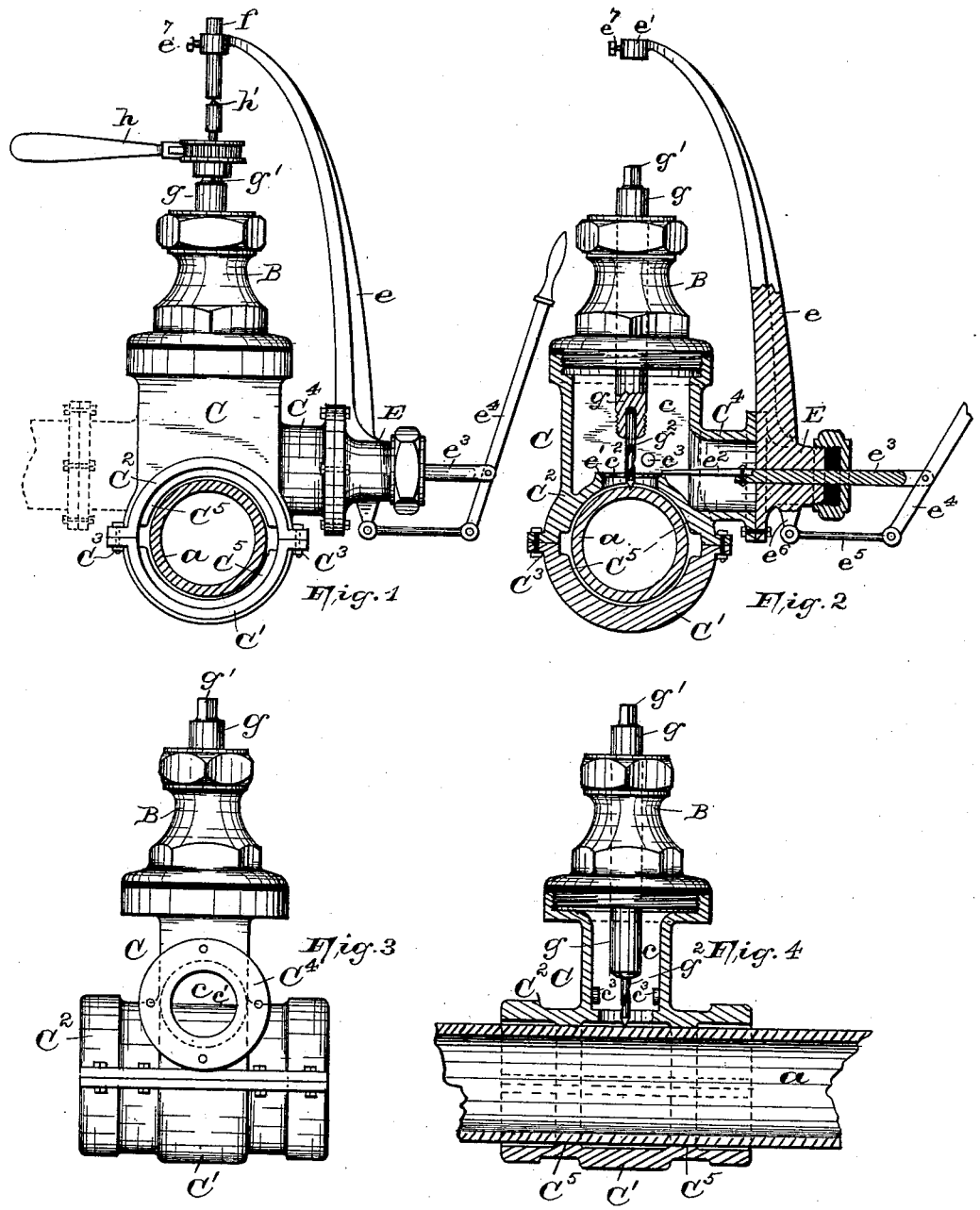

DE WITT C. SMILEY, Jr. & G. BATTY.
APPARATUS FOR TAPPING AND CONNECTING MAINS.

No. 435,548. Patented Sept. 2, 1890.

WITNESSES:
Wm. H. Caufield
Henry J. Falk

INVENTORS:
DeWitt C. Smiley, Jr.
and
George Batty.
BY Fred'k C. Fraentzel, ATTY (No Model.) 3 Sheets—Sheet 3.

DE WITT C. SMILEY, Jr. & G. BATTY.
APPARATUS FOR TAPPING AND CONNECTING MAINS.

No. 435,548. Patented Sept. 2, 1890.

WITNESSES:
Wm. H. Canfield.
Henry J. Falk.

INVENTORS:
DeWitt C. Smiley, Jr.
and
George Batty.
BY Fred C. Fraentzel, ATTY.

UNITED STATES PATENT OFFICE.

DE WITT C. SMILEY, JR., AND GEORGE BATTY, OF NEWARK, NEW JERSEY, ASSIGNORS OF ONE-THIRD TO JOHN HAUSMAN, OF SAME PLACE.

APPARATUS FOR TAPPING AND CONNECTING MAINS.

SPECIFICATION forming part of Letters Patent No. 435,548, dated September 2, 1890.

Application filed June 2, 1890. Serial No. 353,925. (No model.)

*To all whom it may concern:*

Be it known that we, DE WITT C. SMILEY, Jr., and GEORGE BATTY, citizens of the United States, residing at Newark, in the county of Essex and State of New Jersey, have invented certain new and useful Improvements in Apparatus for Tapping and Connecting Mains; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention relates to improvements in an apparatus for making cross-connections with water, gas, oil, steam, or other mains without necessitating shutting off the service throughout a certain section or line of pipe near the point where the connection is to be made.

The invention consists of a valve-casing, the lower part of which is made up of two separate pieces or half-sections adapted to be fitted around the main, said pieces being secured to each other by means of bolts, forming a valve-casing, which has one or two outlets, to which the branch pipe or pipes are attached.

It further consists in the tapping and cutting mechanism, the valve opening and closing mechanism, and in the arrangements and combinations of the several parts, which will be hereinafter more fully described, and finally embodied in the several clauses of the claim.

Figure 5:
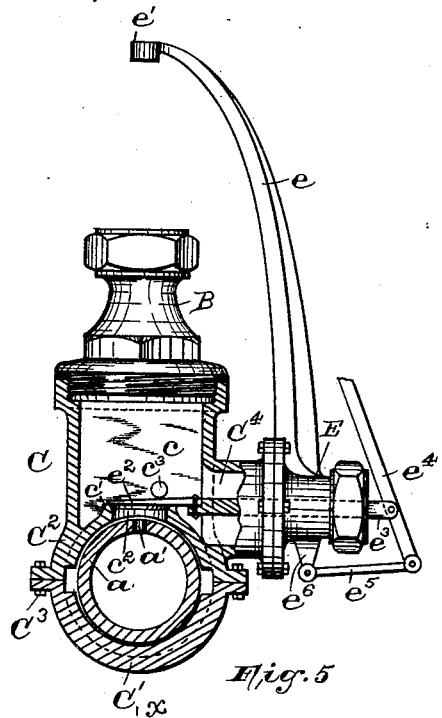
Figure 6:
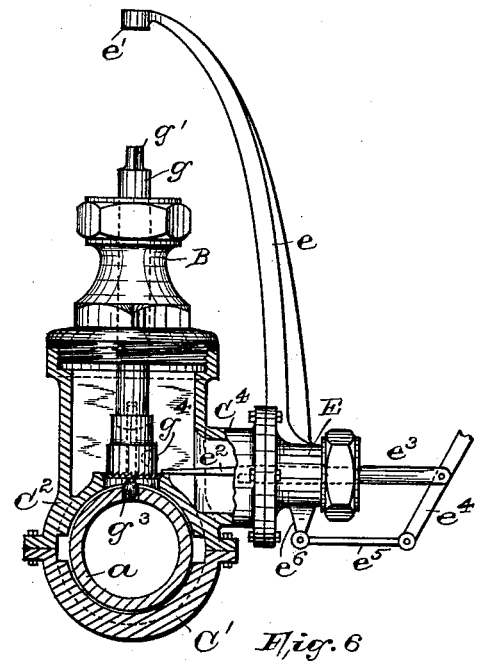
Figure 7:
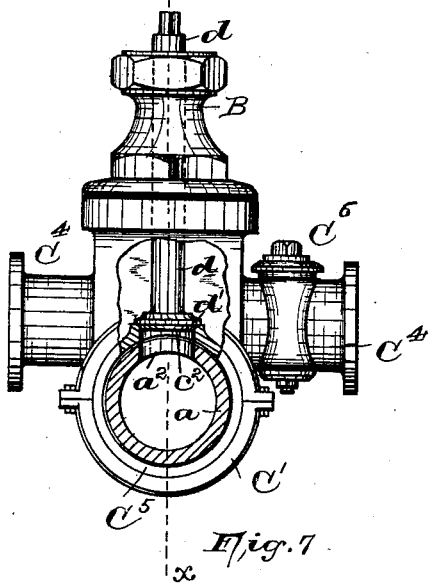
Figure 8:
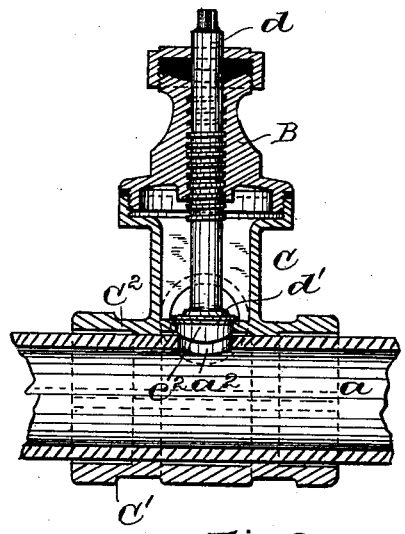
Figure 9:
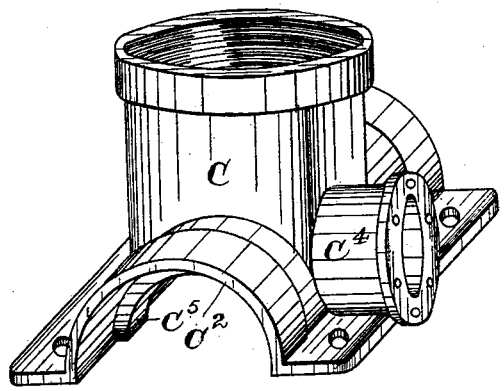
Figure 10:
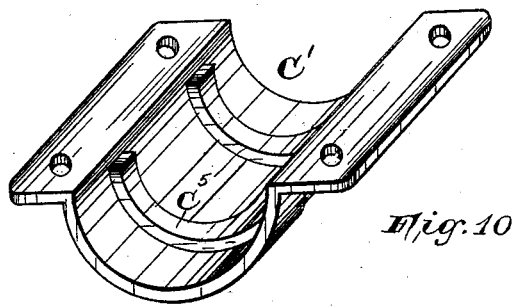
Figures 11, 12, 13:
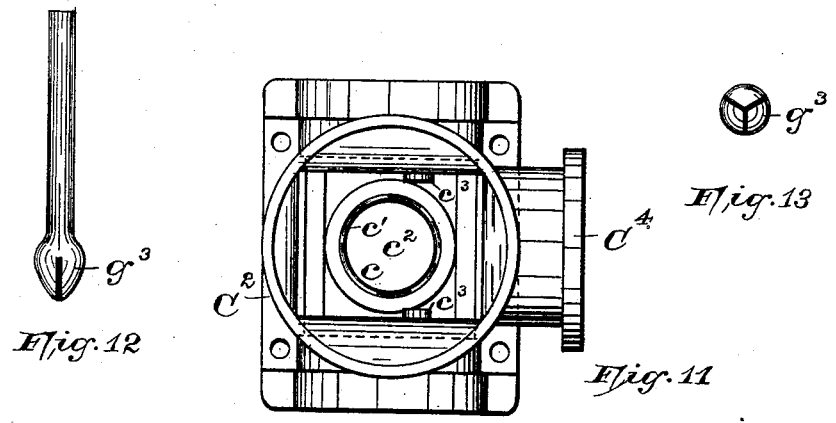

In the accompanying three sheets of drawings, in which similar letters of reference are employed to indicate corresponding parts in each of the different views, Figure 1 is a cross-section of a main and a front elevation of the valve and tapping mechanism arranged thereon. Fig. 2 is a sectional view of the parts illustrated in Fig. 1 to show more clearly the working parts for tapping and drilling the main and for closing the hole thus made when the drill is removed. Fig. 3 represents the valve in side elevation; and Fig. 4 is a sectional view of the same, illustrating the valve in position on the main. On Sheet 2 Fig. 5 is a view similar to Fig. 2, with the drill removed and showing a slide-valve operated by means of a lever arranged over the opening in the main to prevent the escape of water, gas, &c. Fig. 6 is a similar view showing a holding-teat inserted in the hole made by the drill shown in Fig. 2, and the stem also being provided with a shell-cutter for cutting a large opening in the main. Fig. 7 illustrates the valve down upon its seat, while the slide-valve at the side is being removed and cross-connection is being made. Fig. 8 is a vertical section taken through line $x$ in Fig. 7. On Sheet 3 Figs. 9 and 10 are perspective views of the half-sections constituting the valve-casing, and Fig. 11 is a top view of the section illustrated in Fig. 9. Fig. 12 is an enlarged elevation of the split teat for holding the piece to be removed from the main, and Fig. 13 is a view of the under side of said teat.

In said views, $a$ is the main pipe, about which is arranged at the point where connection is to be made a valve-casing C, which consists of two half-sections C' and $C^2$, adjusted around the main, as shown, and secured together by means of the bolts $C^3$. The upper half-section $C^2$ is provided with a valve-chamber $c$, having an ordinary valve-seat $c'$ and an admission-port $c.^2$ As shown in the drawings, said upper half-section $C^2$ is also provided with one or more branch openings $C^4$, and into the top of said valve-chamber is tapped the stuffing-box or cap B, which has arranged therein a valve-stem $d$ and a valve $d'$. When it becomes necessary to connect a branch line with the main, after having excavated a hole and cleaned the rust from the main pipe, said half-sections C' and $C^2$ are arranged around the main and secured together by means of the bolts, as has just been stated.

The half-sections, as is clearly shown in Fig. 4, are provided near their inner ends with the flanges or rims $C^5$, forming a narrow open space at each end of the sections around the main, which are filled in with molten lead in the usual manner and the lead is calked with a calking-iron securely against said inner rims $C^5$, as will be understood. When this has been accomplished, the stuffing-box or cap B, from which the valve and valve-stem have been removed, is secured down upon the valve-chamber c, as indicated in Figs. 1 and 2. To the branch opening $C^4$ is then attached by means of bolts a stuffing-box E, provided with an upwardly-projecting arm or gooseneck e, having at its free end a sleeve or collar $e'$, in which is secured by means of a set-screw $e^7$ a small adjusting-bar f. A false stem g, which is squared off at the end $g'$, to which is fitted an ordinary ratchet h, and the opposite end of which is provided with a removable drill $g^2$, (preferably a twist-drill,) is inserted through the cap or stuffing-box B until the point of the drill rests upon the upper surface of the main. The ratchet h, which has been placed upon the squared end $g'$ of the false stem, and which is held in its proper position by the center $h'$, working in the bar f, is then operated, turning the false stem, and a small hole or opening $a'$ (shown in Fig. 5) is drilled into the main. The drill $g^2$ is then removed and a slide-valve $e^2$ attached to a stem $e^3$, working in the stuffing-box E, is forced over the port $c^2$ by means of a lever $e^4$, so that it rests upon the seat of the port, entirely closing the same and preventing the escape of the fluid from the main into the valve-chamber c, as will be be evident from Fig. 5.

The slide-valve may be of any desirable construction and can be operated by any suitable system of levers, the stem $e^3$ shown in the drawings being operated by a lever $e^4$, connected by means of an intermediately-arranged link $e^5$ with a bracket $e^6$, formed on the stuffing-box E.

As will be clearly seen from Figs. 2, 4, and 5, the valve-chamber c is provided on opposite sides with pins or studs $c^3$, beneath which the slide-valve $e^2$ is pushed, and owing to the inclined upper side thereof it is firmly held down upon the valve-seat $c'$, and thereby forms a tight joint. When the port $c^2$ has thus been closed by said slide-valve, the stuffing-box or cap B is removed from the valve-chamber, the drill $g^2$ removed from the false stem g, a split teat $g^3$ inserted in its place, and a shell-cutter $g^4$ secured to the threaded end of the stem g, as shown in Fig. 6. The cap or stuffing-box B is then once more screwed down upon the valve-casing, the split teat $g^3$ being forced into the hole $a'$ in the main, and a large opening $a^2$ is drilled through the main by means of the cutter $g^4$. The object of using a split teat is to secure the piece of metal to be cut from the main thereto, said split end of the teat holding the metal, owing to its spring action, and thereby preventing the piece from dropping into the main. When the main has been tapped by means of these tools, the shell-cutter and the piece of metal from the pipe attached to the teat $g^3$ are then pulled upwardly and the slide-valve $e^2$ immediately closed over the port $c^2$. The cap or stuffing-box B is again unscrewed and the false stem replaced by an ordinary valve-stem d and its valve $d'$, which, after drawing back the slide-valve $e^2$, is closed down upon its valve-seat $c'$, thereby effectually shutting off the communication between the main a and the valve-chamber c. The stuffing-box E and its slide-valve $e^2$ and operating-levers are then removed from the branch opening $C^4$ and the branch pipe attached to said opening in the usual manner, when the valve $d'$ is raised and free communication is established between the main and the branch pipe.

As shown in Figs. 1, 2, et seq., the valve-casing C has but one branch opening $C^4$; but in Fig. 7 two of such openings are shown, one of which is provided with a plug or other valve $C^6$, which is closed while connection is being made with the main pipe.

It very often happens that after a single branch connection has been made it is desirable to make a second branch connection on the opposite side of the main, in which case when the form of valve-casing shown in Fig. 7 is used all that is necessary is to connect the branch pipe with the opening having the valve $C^6$ therein, which is raised from its seat after the pipe has been attached, and the water or other fluid is thereby allowed to flow through the newly-established branch.

It is evident that the construction herein described is a very simple one, the tapping and drilling mechanism being arranged on the upper side of the main, thereby overcoming many difficulties heretofore experienced, such as digging an extraordinary large hole in order to procure the necessary room for the workmen while making the pipe-connections.

Having thus described our invention, what we claim is—

1. A branch connection for water, gas, or other mains, combining therein a valve-casing consisting of half-sections adjusted and secured around the main, one of said half-sections being provided with a valve-seat and a port, and a valve provided with an upwardly-projecting stem directly above the central axis of the main for raising and lowering the valve, whereby the same is adapted to close upon its seat directly above said main and one or more branch openings connected therewith, for the purposes set forth.

2. A branch connection for water, gas, or other mains, combining therein a valve-casing consisting of half-sections adjusted and secured around the main, one of said half-sections being provided with a valve-seat and a port, a valve adapted to close thereon directly above said main, and branch openings connected therewith, one of which is provided with a valve therein, for the purposes set forth.

3. The combination of a valve-casing consisting of half-sections adjusted and secured around the main, one of said sections being provided with a valve-seat and a port, a cap adapted to be secured upon the upper end of said half-section, and a drilling device, the stem of which works through said cap, said valve-seat and port being arranged within said half-section directly on the top of the main, whereby when the drilling device is removed the main can be shut off by means of a valve working centrally above the axis of the main, for the purposes set forth.

4. The combination of a valve-casing consisting of half-sections adjusted and secured around the main, one of said sections being provided with a valve-seat and a port, a cap adapted to be screwed upon the upper end of said half-section, a false stem provided with a drill working through said cap, a branch opening provided with a stuffing-box having an upwardly-extending arm or goose-neck, and mechanism held by said arm for operating the drill, for the purposes set forth.

5. The combination of a valve-casing consisting of half-sections adjusted and secured around the main, one of said sections being provided with a valve-seat and a port, a cap adapted to be screwed upon the upper end of said half-section, a false stem provided with a drill working through said cap, a branch opening provided with a stuffing-box having an upwardly-extending arm or goose-neck, means held by said arm for operating the drill, and a slide-valve in said branch opening adapted to be forced over said valve-seat in the upper half-section, and means for operating said slide-valve, for the purposes set forth.

6. The combination of a valve-casing consisting of half-sections adjusted and secured around the main, one of said sections being provided with a valve-seat and a port, a cap adapted to be screwed upon the upper end of said half-section, a false stem provided with a drill working through said cap, a branch opening provided with a stuffing-box having an upwardly-extending arm or goose-neck, mechanism held by said arm for operating the drill, a slide-valve in said branch opening, and means for operating the same, consisting, essentially, of a stem to which said slide-valve is secured, a lever $e^4$, a link $e^5$, and bracket $e^6$, all of said parts being arranged as and for the purposes set forth.

7. A branch connection for water, gas, or other mains, combining therein a valve-casing consisting of half-sections adjusted and secured around the main, and provided with inner rims $C^5$, adapted to fit the contour of the main pipe to allow the calking of the valve-casing around the main, a valve-seat and port in one of said half-sections, a valve adapted to be closed thereon directly above the central axis of the main, and one or more branch openings connected with said half-section, for the purposes set forth.

8. The herein-described apparatus for drilling and tapping mains, consisting of a valve-casing made up of half-sections adjusted and secured around the main, one of said sections being provided with a valve-seat and port and one or more branch openings, a stuffing-box removably attached to one of said openings provided with a slide-valve and means for operating the same, an upwardly-projecting arm or goose-neck on said stuffing-box constituting a drill-frame, a false stem provided with a drill and a ratchet or its equivalent removably arranged in one of said half-sections, a cutting-tool or shell-cutter, and a holding-teat arranged on the stem when said drill has been removed, said teat holding the piece of metal adapted to be removed from the main, all of said parts—viz., the false stem, shell-cutter, and teat—working in the valve-chamber, being removably arranged therein, and a valve and its stem arranged and working in the valve-casing on the seat therein directly above the main, substantially as and for the purposes set forth.

9. In an apparatus for tapping and drilling mains, a cutting mechanism consisting of a split valve-casing adjusted and secured around the main, one of which is provided with a valve-seat and port, a false stem provided with a drill, said drill being removably secured to said stem by a cutter-head or shell-cutter, and a centrally-arranged holding-teat removably secured on said stem, as and for the purposes set forth.

10. The herein-described method of tapping and connecting mains with branch lines, which is as follows, to wit: first, adjusting and securing around the main two half-sections, one of which is provided with a valve-seat, and a port and a branch opening; second, tapping the main with a drill; third, withdrawing the same and closing the valve-seat by means of a slide-valve arranged in the branch opening; fourth, placing a shell-cutter and a holding-teat on the false stem in place of the small drill; fifth, withdrawing the slide-valve from the valve-seat and lowering the shell-cutter and cutting a large opening in the main and removing the piece of metal by means of the holding-teat; sixth, removing said parts and closing the slide-valve over the valve-seat again; seventh, exchanging the cutting-tool for an ordinary valve and valve-stem; eighth, opening the slide-valve and closing the valve just substituted; ninth, removing the slide-valve and drill-holding mechanism from the branch opening; tenth, connecting said opening with a branch pipe, and, finally, raising the valve from its seat above the main, as and for the purposes set forth.

11. The herein-described method of tapping and connecting mains with branch lines, which is as follows, to wit: first, adjusting and securing around the main two half-sections, one of which is provided with a valve-seat, and a port and a branch opening; second, tapping the main directly below the said port; third, closing said valve-seat by means of a slide-valve arranged in the branch opening to prevent the escape of the water or gas from the main; fourth, removing the tapping mechanism and replacing the same for an ordinary valve and valve-stem; fifth, opening the slide-valve and closing the valve just substituted upon its seat; sixth, removing the slide-valve and its drill-holding mechanism, and, lastly, connecting said opening while the valve is closed with a branch pipe, as and for the purposes set forth.

12. A valve-casing consisting of upper and lower half-sections provided with means for securing the same together and adjusting them permanently around the main, one of said sections being provided with an annular valve-seat and port, a valve and stem adapted to be closed thereon, and one or more branch openings in said half-section, for the purposes set forth.

13. The combination of a valve-casing consisting of half-sections adjusted around the main and means for securing them together, one of said half-sections having a valve-chamber and a valve-seat and port therein, a branch opening in direct communication with said valve-chamber, and a drilling and tapping mechanism working through a stuffing-box or cap in the top of said valve-chamber directly above and centrally through the valve-seat and port for tapping the main on its upper side, for the purposes set forth.

14. The combination of a valve-casing consisting of half-sections adjusted around the main and means for securing them together, one of said half-sections having a valve-chamber and a valve-seat and port therein, a branch opening in direct communication with said valve-chamber, a drilling and tapping mechanism working through a stuffing-box or cap in the top of said valve-chamber directly above and centrally through the valve-seat and port, a slide-valve in said branch opening adapted to be forced over said valve-seat and port, and means for operating said slide-valve, for the purposes set forth.

15. The combination, with a main pipe, of a valve consisting of half-sections, one of which is provided with a valve-chamber directly above the main, having an annular valve-seat and a port and a branch opening in direct communication with said chamber, and a slide-valve in said branch opening extending into said valve-chamber and operating to close said valve-seat, as and for the purposes set forth.

16. The combination, with a main pipe, of a valve-casing consisting of half-sections provided with a valve-chamber directly above the main having an annular valve-seat and a port, a branch opening in direct communication with said chamber, a slide-valve in said branch opening extending into said valve-chamber sliding upon said valve-seat, and pins or studs in said chamber operating to hold said slide-valve in position over the valve-seat and port, as and for the purposes set forth.

In testimony that we claim the invention set forth above we have hereunto set our hands this 28th day of May, 1890.

DE WITT C. SMILEY, JR.
GEORGE BATTY.

Witnesses:
JOHN HAUSMAN,
FREDK. C. FRAENTZEL.